United States Patent
Abdelhalim et al.

(10) Patent No.: US 11,106,520 B2
(45) Date of Patent: Aug. 31, 2021

(54) SYSTEMS AND METHODS FOR PREVENTING CLIENT APPLICATION CRASHES DUE TO OPERATING SYSTEM UPDATES

(71) Applicant: DELL PRODUCTS L.P., Round Rock, TX (US)

(72) Inventors: Alan H. Abdelhalim, Pflugerville, TX (US); Abu S. Sanaullah, Austin, TX (US)

(73) Assignee: Dell Products L.L.P., Round Rock, TX (US)

(*) Notice: Subject to any disclaimer, the term of this patent is extended or adjusted under 35 U.S.C. 154(b) by 211 days.

(21) Appl. No.: 16/385,792

(22) Filed: Apr. 16, 2019

(65) Prior Publication Data

US 2020/0334102 A1   Oct. 22, 2020

(51) Int. Cl.
   *G06F 11/07* (2006.01)
   *G06F 9/4401* (2018.01)

(52) U.S. Cl.
   CPC ........ *G06F 11/0778* (2013.01); *G06F 9/4406* (2013.01); *G06F 11/0793* (2013.01)

(58) Field of Classification Search
   CPC . G06F 11/0778; G06F 11/0793; G06F 9/4406
   See application file for complete search history.

(56) References Cited

U.S. PATENT DOCUMENTS

| | | | |
|---|---|---|---|
| 10,069,710 B2 | 9/2018 | Boyapalle et al. | |
| 10,089,482 B2 | 10/2018 | Skipper et al. | |
| 10,157,286 B2 | 12/2018 | Skipper et al. | |
| 2012/0272103 A1* | 10/2012 | Calinoiu | G06F 11/3688 714/47.1 |
| 2018/0131579 A1* | 5/2018 | Jacobs | H04L 41/082 |
| 2020/0241868 A1* | 7/2020 | Murthy | G06F 11/3409 |

OTHER PUBLICATIONS

Wikipedia, "Association Rule Learning", Printed From Internet Nov. 30, 2018, 13 pgs.

(Continued)

*Primary Examiner* — Matthew M Kim
*Assistant Examiner* — Kyle Emanuele
(74) *Attorney, Agent, or Firm* — Egan, Enders & Huston LLP

(57) ABSTRACT

Systems and methods may be implemented to prevent application crashes by correlating a history of operating system (OS) updates with occurrence of past client application crashes using information that is crowd-sourced from multiple information handling systems so that action/s may be taken to prevent occurrence of future client application crashes on the information handling system/s. Machine learning (e.g., deep learning) may be employed to automatically correlate the history of OS updates with a record of past client application crashes that have occurred on multiple client information handling systems, and then the likely root cause/s for the client application crashes identified based on this correlation. These likely root cause/s may be corrected or otherwise addressed, e.g., by further investigation into the details of the root cause, and/or user or automatic system action to remove or block the root cause.

24 Claims, 3 Drawing Sheets

(56) References Cited

OTHER PUBLICATIONS

Wikipedia, "Crowdsourcing", Printed From Internet Nov. 30, 2018, 35 pgs.
Wikipedia, "Deep Learning", Printed From Internet Nov. 30, 2018, 30 pgs.
Microsoft, Windows IT Pro Center, "Overview of Windows as a Service", Sep. 2018, 6 pgs.
Microsoft, Windows Dev Center, "About WER", May 2018, 1 pg.
Wikipedia, "Machine Learning", Printed from Internet Feb. 23, 2019, 23 pgs.
Wikipedia, "Stack Trace", Printed From Internet Nov. 2018, 2 pgs.
Statsoft, Association Rules, "Big Data, How to Detect Relationships Between Categorical Variables", 2018, 3 pgs.
Stack Exchange, "Windows Update Broke Programs", 2018, 2 pgs.
Microsoft, "Using Driver Verifier to Identify Issues With Windows Drivers for Advanced Users", Printed From Internet Nov. 2018, 21 pgs.
Leonhard, Computerworld, "Windows as a Service in a Nutshell, Explained", Aug. 2017, 5 pgs.
Microsoft Docs, "What's New in WER", May 30, 2018, 3 pgs.

* cited by examiner

SYSTEMS AND METHODS FOR PREVENTING CLIENT APPLICATION CRASHES DUE TO OPERATING SYSTEM UPDATES

FIELD

This invention relates generally to information handling systems and, more particularly, to operating systems and client application performance for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Operating system updates and new feature packs are pushed by operating system (OS) vendors regularly in the background, especially under default settings, e.g., Windows as a Service (WaaS) in Windows 10® operating system. Changes in the OS can break client applications, such as when there is a bug in the OS update, or when the OS update is directed toward fixing a long-standing issue that exposes bugs in client applications. Such situations often manifest as application crashes. Once affected user client applications start crashing, it is very hard for the user to figure out after the fact which OS update is causing the crash, much less report it to the OS vendor. It is even harder to pinpoint a problematic OS update if multiple sets of OS updates have been installed since the user last used an affected application. This causes users to either endure a complicated iterative trial-and-error process of removing OS updates and then retesting affected application/s, or to return the system to a previous backup/restore point. The latter solution may be easier to perform initially, but it re-exposes the machine to previously-fixed vulnerabilities and only lasts until OS updates responsible for the application crashes are again pushed to the system. These problems cause a bad system user experience, and may also increase manufacturer support costs since users will contact the manufacturer to report issues caused by OS updates and will need assistance to resolve these issues.

The conventional technique for determining root cause of OS components causing a client application crash is currently a manual developer-level debugging process. In some cases, OS vendors will collect client application crash data. If a client application crash incidence rate is high enough, an OS vendor may assign developers and testers to analyze the application crash data in an attempt to find a solution. But in other cases, the client system user is only provided with generic advice/feedback such as to try to install the latest updates for the OS application and/or driver. When this generic device does not help, client systems users typically call technical support personnel who manually walk the user through steps for restoring their system. This degrades the user experience and may be costly to the system manufacturer. As OS updates become more frequent, the potential increases for application crashes due to OS updates.

Recent Microsoft OS versions include a Windows Error Reporting (WER) feature that tracks driver blue screen of death (BSOD) occurrences and identifies potential drivers responsible for BSOD crashes. WER looks for the top first non-Microsoft driver on the stack upon occurrence of a kernel fault/bugcheck/blue screen of death (BSOD). The WER feature reports the top first non-Microsoft driver on the stack together with a given stack trace.

A performance monitoring system known as Dell® Data Vault (DDV) has been provided on client information handling systems, and collects information on OS updates (update name, publisher, and install date populated by the OS vendor) that is then uploaded to a backend server across the Internet.

SUMMARY

Disclosed herein are systems and methods that may be implemented to prevent application crashes by correlating a history of operating system (OS) updates with occurrence of past client application crashes using information that is crowd-sourced from multiple information handling systems so that action/s may be taken to prevent occurrence of future client application crashes on the information handling system/s (e.g., actions such as removing particular identified culprit OS updates responsible for client application crashes from the information handling systems, blocking such culprit OS update/s from installation or re-installation on the information handling systems until the OS vendor has corrected or modified the culprit update/s, etc.). In one embodiment, machine learning (e.g., deep learning) may be employed to automatically correlate the history of OS updates with a record of past client application crashes that have occurred on multiple client information handling systems, and then the likely root cause/s for the client application crashes identified based on this correlation. These likely root cause/s may be corrected or otherwise addressed, e.g., by further investigation into the details of the root cause, and/or user or automatic system action to remove or block the root cause.

In one exemplary embodiment, a support agent may execute on a host processing device of each of one or more user information handling systems. The support agent may collect data about each OS update that occurs (e.g., update identifier, date of the update, data size of the update, installed OS version, etc.) and data about each client application crash that occurs (e.g., crashes application identifier (e.g., code or name), crashed application version, application crash stack trace for the application crash, date of the application crash, etc.) on each user system. In a further embodiment, the support agent executing on each user information handling system may upload (e.g., on a regular basis) the collected OS update and application crash data (e.g., over a network) to one or more information handling systems configured as backend servers. Processing device/s on the backend server/s may be programmed to execute an application or other code to in turn collect and analyze the uploaded OS update and application crash data to determine correlation between OS updates and application crashes, e.g., to identify one or more candidate OS update culprits that are potentially responsible for crash/es of particular client applications that have occurred on the client information handling system/s. This correlation information may be stored on the backend server/s.

In a further exemplary embodiment, the support agent executing on a user information handling system may be executed to periodically or otherwise regularly check across a network with the application or other code executing on the backend server/s to see if any potential culprit OS updates have been identified as being responsible for particular client application crashes that have been submitted on previous days by the support agent to the backend server/s. The application or other code may respond to these queries from the client system/s by providing the correlation information (between OS updates and application crashes) to the client information handling system across the network. The support agent on the client information handling system may utilize the correlation information received from the backend server/s to take one or more actions and/or build a report, e.g., a report that incudes a correlation between all client application crashes for which the backend server has identified potential OS update culprits and/or which builds on such a correlation to determine OS updates that should be removed or blocked from installation or re-installation on the client system. In this regard, the support agent may make such a report available to a user-facing application which then may display this correlation and/or recommendation information to the user of the system to guide the user toward prevention of future client application crashes by surgical modification that may include removing and/or blocking particular culprit OS update/s from installation or re-installation on the client system until the OS vendor fixes the problem (e.g., by modifying the OS updates such that the application crashes no longer occur). In one exemplary embodiment, the support agent may optionally take one or more actions to prevent future application crashes by automatically blocking and/or removing the culprit OS updates from the client system without user instruction.

In one exemplary embodiment, rule-based machine learning (e.g., deep learning such as using deep neural networks, etc.) techniques may be applied to uploaded OS update and application crash data by application or other code executing on backend server/s to determine relationship and correlations (e.g., cross-tabulation tables) between culprit OS updates and particular application crashes. Specific examples of such machine learning techniques include, but are not limited to, one or more association rule learning algorithms (e.g., such as Apriori, Eclat, FP-Growth, etc.) applied by backend server/s to the data in order to discover OS update-to-client application-crash correlations ("associations") to help detect and pinpoint potential culprits. In such an embodiment, association rule learning may be so applied to find association rules of the kind: "If (A=X) then (C is likely=Z)" or "If (A=X and B=Y) then (C is likely=W) ". For example, given the identity and version of a crashed application together with the crash stack trace, an Association Rule may be used to determine the likely OS update culprit for the application crash. As an example: If (Crashed Application=Adobe Version XY) then ((Updates KB123456, KB134789, KB195678, KB123457 are likely crash culprits)).

In a further embodiment, confidence in the accuracy of correlation between may be increased over raw correlations found by standard association-rule-based deep-learning algorithm/s, e.g., by considering additional variables. For example, client application crash-versus-OS update associations may in one exemplary embodiment be filtered on dates to limit the analysis to combinations that occur within a similar timeframe and to exclude combinations that occur too far apart. This date-filtering may be utilized to avoid the raw association-rule algorithm blindly linking old updates to recent crashes based on pure correlation. In another exemplary embodiment, OS update culprits may be restricted to OS updates that contain non-driver binaries directly implicated in crash stack traces, e.g., to narrow down culprits to one or more specific non-driver binaries and versions thereof, and their container updates. This may be accomplished in one embodiment by: 1) parsing crash stack traces from client application crashes to locate and retrieve a list of non-driver binaries involved in the client application crash; 2) parsing the contents of OS updates to get information on their payload of non-driver binaries and their versions; and 3) cross-checking modules on the stack with ones changed in an update. This process may be implemented in one embodiment to formulate a recommendation to a client system user of a narrow and focused set of OS updates that can be removed and blocked to restore client application functionality while awaiting a permanent fix from the OS vendor. In one optional embodiment, automatic removal and blocking of these set of OS updates may be performed, e.g., together with display of a notification of this action to the client system user.

In one respect, disclosed herein is a method, including: gathering information across a network from multiple information handling systems, the information including a history of updates made to an operating system (OS) executing on each of the multiple information handling systems, and a history of crashes of different client applications executing on the multiple information handling systems; correlating the history of operating system (OS) updates with the history of client application crashes to identify one or more candidate OS updates potentially responsible for causing a given client application to crash on the multiple information handling systems; and taking one or more actions to prevent occurrence of future crashes of the given client application caused by the identified candidate OS updates on one or more of the multiple information handling systems.

In another respect, disclosed herein is a system, including at least one first programmable integrated circuit programmed to: gather information across a network from multiple information handling systems, the information including a history of updates made to an operating system (OS) executing on each of the multiple information handling systems, and a history of crashes of different client applications executing on the multiple information handling systems; correlate the history of operating system (OS) updates with the history of client application crashes to identify one or more candidate OS updates potentially responsible for causing a given client application to crash on the multiple information handling systems; and transmit the identity of the one or more candidate OS updates potentially responsible for causing a given client application to crash across the network to at least one of the multiple information handling systems.

DESCRIPTION OF ILLUSTRATIVE EMBODIMENTS

Figure 1:
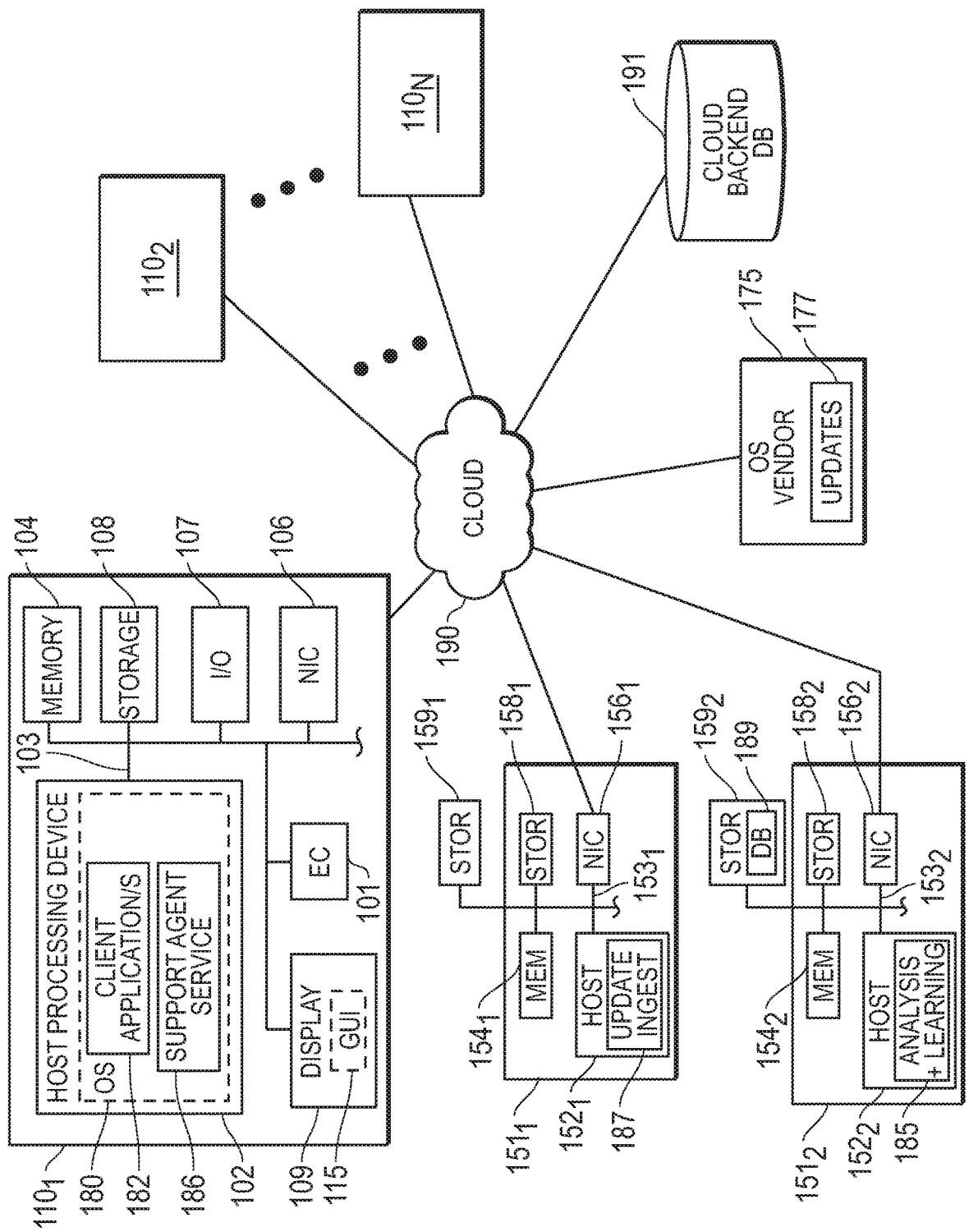
FIG. 1 illustrates a network architecture according to one exemplary embodiment of the disclosed systems and methods.

FIG. 1 illustrates one exemplary embodiment of a network architecture 100 that includes multiple client information handling systems $110_1$-$110_N$, and backend server information handling systems $151_1$ and $151_2$ that are in communication (e.g., via TCP/IP or Internet protocol) with each other, e.g., across a network such as the Internet or corporate intranet. In this embodiment, each of client systems $110_1$-$110_N$ may be, for example, a non-mobile desktop or tower computer, or may be a mobile system such as notebook or laptop computer, tablet computer, smart phone, etc. It will be understood that a network architecture may include any other greater or lesser number of multiple information handling systems $110_1$-$110_N$ and $151_1$, $151_2$ may be similarly coupled together across a network.

In FIG. 1, components of client system $110_1$ may be representative of components of other client systems $110_2$-$110_N$, and include at least one host processing device 102 (e.g., AMD or Intel-based CPU such as Itanium or any other type of suitable host processing device), one or more buses or communication media 103 (e.g., PCIe bus, USB, SMBus, SATA, other appropriate data buses such as memory bus, etc.), non-volatile storage 108 (e.g., hard drive/s, solid state drive/s "SSDs" and or other non-volatile memory), and system volatile memory (e.g., DRAM) 104. Bus/es 103 of system $110_1$ may be present to provide a mechanism for the various components of system $110_1$ to communicate and couple with one another. A network interface controller (NIC) 106 may be communicatively coupled to allow various components of system $110_1$ to communicate through NIC 106 with components of backend server information handling systems $151_1$ and $151_2$, as well as OS vender server/s 175 (e.g., Microsoft or other OS vendor servers), e.g., across a network such as Internet or corporate intranet. As shown, system $110_1$ may also be provided as shown with an embedded controller (EC) 101.

The host processing device/s 102 of system 110 may execute programming for system $110_1$ including one or more client application/s 182 and a support agent service 186 on a host operating system (OS) 180 (e.g., Microsoft Windows-based OS, Linux-based OS, Android OS, iOS, etc.). Examples of client application/s 182 include, but are not limited to, PDF viewer such as Adobe Acrobat®, web browser such as Microsoft Edge®, Mozilla Firefox®, and/or Google Chrome®; word processing, presentation and/or spreadsheet productivity software such as Microsoft Office® software including Word® word processor application, PowerPoint® presentation application, Excel® spreadsheet application; etc. Support agent service 186 is described further herein, and may be provided to collect data about each OS update that occurs (e.g., update identifier, date of the update, data size of the update, installed OS version, etc.) and data about each client application crash that occurs (e.g., application identifier (e.g., code or name), crashed application version, application crash stack trace, date of the application crash, etc.) on system $110_1$.

As further shown in FIG. 1, system $110_1$ may include display device component 109 (e.g., LCD display, LED display, LCD or LED display touchscreen device, etc.) for displaying visual information generated by client application/s 182 and support agent service 186) to a human user (e.g., including a graphical user interface (GUI) 117 generated by support agent service 186) and optionally for receiving user input from a human user. System $110_1$ may alternatively or additionally include input/output (I/O) component/s 107 (e.g., mouse, keyboard, etc.) as shown for performing this function. Display device 109 may be coupled to bus 103 as shown and/or may be optionally coupled directly to host processing device 102 depending on the particular configuration of the given system 110 (e.g., coupled directly to integrated graphics of a host processing device 102 and/or separately coupled via bus 103 to receive video information from an optional graphics processor unit "GPU" not shown).

Still referring to FIG. 1, each of backend server systems $151_1$ and $151_2$ may include various components that are configured to operate and function similar to corresponding components of system 110. Such components may include at least one host processing device 152 (e.g., AMD or Intel-based CPU such as Itanium or any other type of suitable host processing device), one or more buses or communication media 153 (e.g., PCIe bus, USB, SMBus, SATA, other appropriate data buses such as memory bus, etc.), internal non-volatile storage 158 (e.g., hard drive/s, solid state drive/s "SSDs" and or other non-volatile memory), external non-volatile storage 159 (e.g., RAID or other type of external storage system), system volatile memory 154 (e.g., DRAM), and NIC 156 that is communicatively coupled to allow various components of each system $151_1$ and $151_2$ to communicate through its NIC 156 with components of other information handling systems 100 and 151. It will be understood that tasks of one or more components of systems $151_1$ and/or $151_2$ may be distributed among multiple separate backend systems coupled together, e.g., storage tasks of storage 158 may be performed by internal and/or external storage components to a chassis of each system 151 and $151_2$ as shown.

As described further herein, OS update ingestion logic 187 may be executing on host processing device $152_1$ of backend server $151_1$, and analysis and learning logic 185 may be executing on host processing device $152_2$ of backend server $151_2$. OS update ingestion logic 187 and analysis and learning logic 185 may operate together to correlate a history of operating system (OS) updates 177 from OS vender server/s 175 with occurrence of past crashes of client application/s 182 on one or more of information handling systems $110_1$ to $110_N$. OS updates 177 may include both problem OS updates that cause application crashes, and non-problem OS updates that do not cause application crashes. A database 189 of analysis results from this correlation may in turn be maintained in non-volatile storage $159_2$ (or alternatively internal non-volatile storage $158_2$) by analysis and learning logic 185 of backend server $151_2$ as shown.

Figure 2:
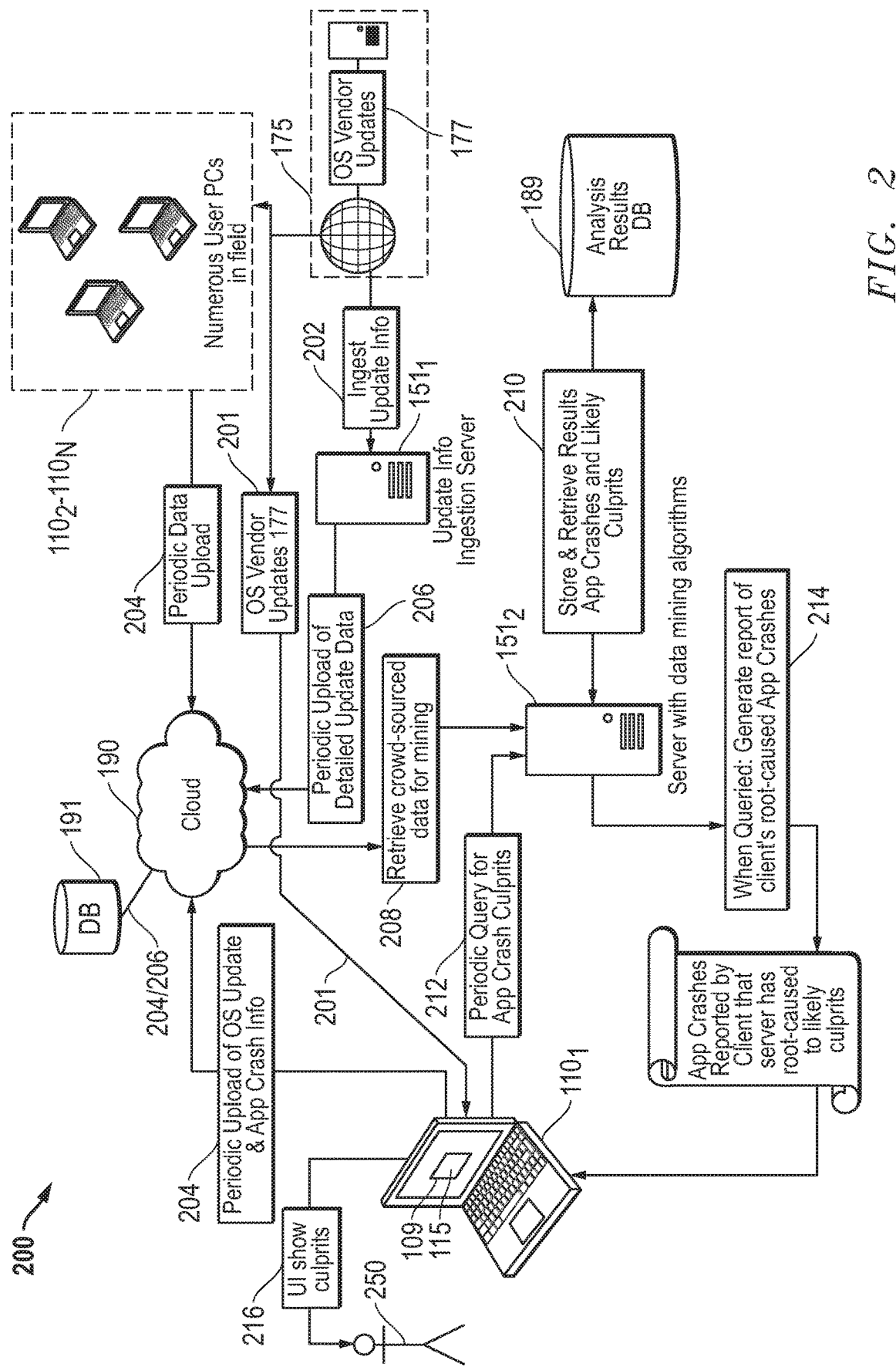
FIG. 2 illustrates client system-backend server flow according to one exemplary embodiment of the disclosed systems and methods.

FIG. 2 illustrates one exemplary embodiment of client system and backend server flow 200 that may be automatically performed in one embodiment, for example, using the components of network architecture 100 of FIG. 1. As shown, in data flow 201 of FIG. 2, OS vender server/s 175 may provide periodic OS updates 177 to each of client systems 110, e.g., across a network. In data flow 202, OS vendor update payload information corresponding to updates 177 (e.g., list of binary names, dates, versions, etc.) may be periodically provided to and ingested by update ingestion logic 187 of backend server $151_1$, where it may be stored on internal storage $158_1$ and/or external storage $159_1$ of backend server 151₁. Such periodic ingestion of OS Vendor update payload information may occur, for example, during regular OS update days (e.g., such as Microsoft's Patch Tuesday).

In data flow 204, any new OS update events (e.g., OS updates, OS version, etc.) and new application crash information for client application crash events (e.g., crashed application identifier (e.g., code or name) and version, application crash stack traces, exception calls, crashing module name, crash module version, crash date, etc.) may be periodically collected and uploaded by support agent service 186 of each client system 110 (e.g., once every day or other suitable time period) via a network such as Internet or corporate intranet to a cloud 190 that includes a cloud-based backend database 191. In one embodiment support agent service 186 may optionally provide the new OS update event information and application crash information to an information handling system performance monitoring system data repository also executing on information handling system 110, which may perform the upload data flow 204. One example of a suitable information handling system performance monitoring system data repository is known as Dell® Data Vault (DDV), and is described in U.S. Pat. No. 10,069,710, which is incorporated herein by reference in its entirety for all purposes.

In data flow 206, detailed OS update data (e.g., binary version of OS updates, update name, publisher, and install date populated by the OS vendor, etc.) may be uploaded via a network such as Internet or corporate intranet to the cloud-based backend database 191 of cloud 190 by backend server 151₁. However, it will be understood that crowd sourced information of data flows 204 and 206 may alternatively be uploaded directly to a database maintained by backend server 151₂. In any case, the uploaded and stored crowd sourced information on cloud-based database 191 may be retrieved from cloud 190 via data flow 208 (e.g., across a network such as Internet or corporate intranet) by analysis and learning logic 185 of backend server 151₂, where it may be analyzed to determine correlation (association) between reported crashes of client application/s 182 and OS updates 177 to identify particular culprit OS updates 177 responsible for crashes of particular client application/s 182, e.g., as described below in relation to FIG. 3.

Figure 3:
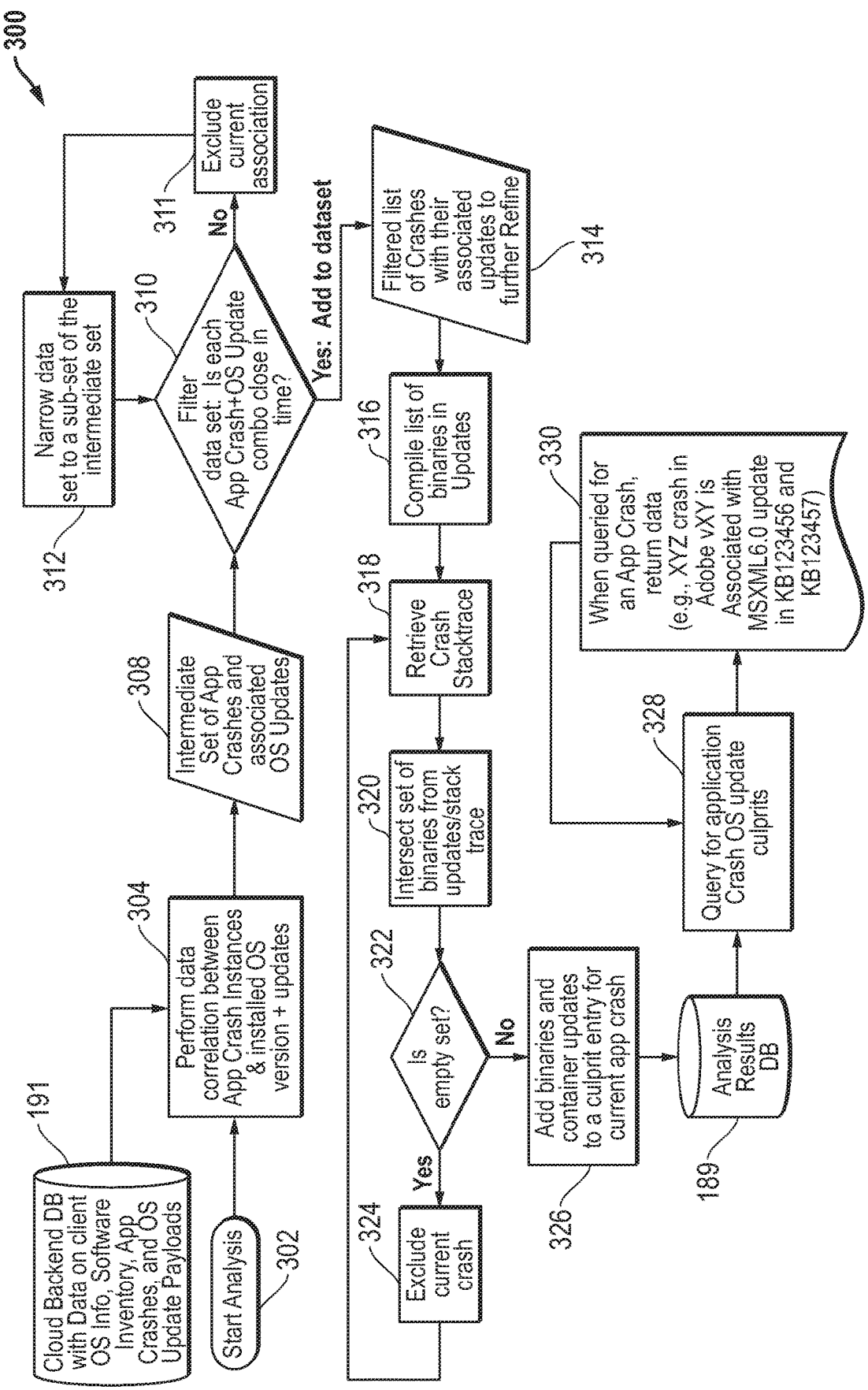
FIG. 3 illustrates methodology according to one exemplary embodiment of the disclosed systems and methods.

FIG. 3 illustrates one exemplary embodiment of a backend analysis methodology 300 that may be executed in one embodiment, for example, by analysis and learning logic 185 executed on host processing device 152₂ of backend server 151₂. As shown, methodology 300 starts at step 302 and moves to step 304 where analysis and learning logic 185 executing on host processing device 152₂ of backend server 151₂ may be programmed to perform a first level data correlation between client crowd-sourced application crashes and installed OS versions 180 (with OS updates 177). To implement step 304, analysis and learning logic 185 may retrieve the collected and stored raw crowd-sourced information via data flow 208 from backend database 191 of cloud 190 for further processing. In this regard, backend database 191 may include information received over a period of time from client system/s 110 (e.g., information on configuration, version and installed dates of client OS instance 180 on each client system 110; data on crashes of particular client application/s 182 occurring on each client system 110 including occurrence dates of such crashes; software inventory of all client applications and OS updates instances on each client system 110 together with installed dates of each client application and OS update on each client system 110; etc.), as well as detailed OS update information received over a period of time from backend server 151₁ (e.g., OS update payload, date and details of same, etc.). In this regard, information 204/206 stored on database 191 may span any available or desired time period, e.g., such as one year, two years, etc. In one embodiment database 191 may store raw crowd-sourced information from data flows 204/206 that has been accumulated since inception of database 191.

Still referring to FIG. 3, analysis and learning logic 185 on backend server 151₂ may in one embodiment utilize machine learning techniques to perform first level correlation tasks of step 304 to discover intermediate OS update-to-client application crash correlations ("associations" such as cross-tabulation tables) 308 within the raw crowd-sourced information of data flows 204/206 stored on database 191 to help detect and determine identity of particular OS updates 177 that are potential culprits for causing crashes of particular client application/s 182. Examples of suitable machine learning techniques that may be so employed in step 304 include association rule learning algorithms (e.g., such as Apriori, Eclat, FP-Growth, etc.) applied by backend server/s 151₂ to the data in order to discover OS update-to-client application-crash correlations ("associations") to help detect and pinpoint potential culprits. In such an embodiment, association rules may be so applied to find rules of the kind "If (A=X) then (C is likely=Z)" or "If (A=X and B=Y) then (C is likely=W)". For example given the identity and version of a crashed application an Association Rule may be used to determine one or more likely OS update culprits for the application crash. As an example: If (Crashed Application=Adobe Version XY) then (Updates KB123456, KB134789, KB195678, KB123457 are likely crash culprits)).

In one embodiment, OS update-to-client application crash correlation detection methodology may be performed in step 304 by comparing crash rate for a particular client application version 182 executing on different client systems 110 that have different installed OS updates 177. Such a comparison may be performed to identify existence of a relatively higher crash rate of the particular application 182 on client systems 110 executing a particular combination of OS version 102 and a given OS update 177 as compared to other client systems 110 that execute the same OS version 102 but without the given OS update 177. Such a determined crash rate may be expressed or measured in any suitable manner, e.g., such as a simple COUNT of the instances where an OS version/OS Update, and Application Crash correlate. An example of such a COUNT would be: Win10 RS4 that is running Adobe 10.6 has 50 recorded crashes when OS update KB123456 is installed, but has no recorded crashes when OS update KB123456 is not installed.

A hypothetical example of an OS update-to-client application crash correlation detection in step 304 from the total accumulated raw crowd-sourced information of backend database 191 would be detection of an unusually high (e.g., outlier) crash rate for a given version XY of an Adobe Reader® application executing on client system/s 110 having the Windows 10 RS3 operating system in combination with an installed KB123456 OS update as compared to lower crash rate of the same version XY of Adobe Reader® application experienced on other client system/s 110 that are executing the same Windows 10 RS3 operating system but without the KB123456 OS update installed. In this example, the relatively higher detected Adobe Reader® crash rate in the presence of the installed KB123456 OS update indicates that the KB123456 OS update may be the culprit causing the higher crash rate of the Adobe Reader® application version XY. This determined association between Adobe Reader® vXY crashes and the culprit KB123456 OS update may be included as part of the determined intermediate OS update-to-client application crash correlation 308 information of FIG. 3, e.g., which may also include other associations between culprit OS updates 177 and client applications 182 that have experienced relatively high crash rates. In one embodiment, the intermediate OS update-to-client application crash correlation 308 information may be temporarily stored in memory 154$_2$ or internal storage 158$_2$ for optional further analysis as described below. However, in another embodiment (e.g., where no further analysis is to be performed), the intermediate OS update-to-client application crash correlation 308 information may be instead be stored via data flow 210 in step 314 to a correlation dataset (e.g., list) stored in database 189.

As shown in FIG. 3, additional processing may be performed on the raw intermediate correlation information 308 (e.g., in this case based on total accumulated raw crowd-sourced information that has been retrieved by data flow 208 from backend database 191) which has been found by machine-learning algorithm/s to raise the confidence in the initial associations between client applications 182 experiencing relatively high crash rates and corresponding culprit OS updates 177. For example, in steps 310-312 intermediate correlation information 308 may be iteratively date range-filtered to limit the correlation information to include only those OS update-to-client application crash associations that have occurred within a similar (e.g., recent) time frame (e.g., such as within the last month, within the last 30 days, within the last two months, etc.). This may be done in one embodiment to remove (filter out) any OS update-to-client application crash associations contained in raw correlation information 308 that may blindly link relatively old OS updates (e.g., OS updates installed more than a month or 30 days ago) to relatively recent client application crashes (e.g., crashes occurring within the last month or 30 days).

Specifically, each OS update-to-client application crash association contained in raw correlation information 308 may be examined one at a time in step 310 to determine if it includes an OS update 177 that is relatively old and, if so, this OS update-to-client application association is excluded from the intermediate correlation information 308 to produce a narrowed date-limited data set in step 312 that includes a subset of original intermediate correlation information 308. Steps 310 to 312 may iteratively repeat in this manner until there are no OS update-to-client application associations remaining in the subset that include an OS update 177 that is relatively old. In one embodiment, the resulting date range-filtered subset of client application crashes and corresponding culprit OS updates 177 may be temporarily stored in memory 154$_2$ or internal storage 158$_2$ for optional further analysis and refinement as described below to further improve confidence in the remaining associations between crashes of applications 182 and particular OS updates 177. In another embodiment (e.g., where no further analysis is to be performed), the resulting date range-filtered subset of client application crashes and corresponding culprit OS updates 177 may be added via data flow 210 in step 314 to a date-filtered dataset (e.g., list) stored in database 189.

Next, in steps 316-326, associations of culprit OS updates-to-application crashes from the date-filtered dataset of step 314 may be further restricted to only include OS updates that contain non-driver binaries (i.e., non-text machine code or binary files) directly implicated in crash stack traces. Specifically, a set of the non-driver binaries in the culprit OS updates 177 contained in the date filtered dataset of step 314 may be first compiled in step 316, e.g., a set of binaries patched in an Update from the OS Vendor update package itself (177 in FIG. 2) which is regularly ingested by update info ingestion server 151$_1$ from OS vendor update server 175, or by parsing the application crash information included in the date-filtered data set of step 314. Next, steps 318 to 326 may be iteratively performed to retrieve and analyze each application crash stack trace included in the date-filtered data set of step 314, i.e., corresponding to an application crash entry included in the date-filtered list of culprit OS updates-to-application crashes of step 314. Each stack trace may include a sequence of nested functions that occurred up to an error.

Specifically, in step 318 an application crash stack trace corresponding to a current selected application crash entry of the date-filtered data set of step 314 is retrieved and placed in a stack trace set that is then compared in step 320 to the set of non-driver OS update binaries of step 316 to identify any intersections between these two sets. If the result in step 322 from the comparison of step 320 is not found to be an empty set (i.e., meaning that the current crash stack trace refers to at least one binary contained in the set of OS update binaries of step 316), then methodology 300 proceeds to step 326 where the non-driver OS update binaries and container updates corresponding to the culprit OS update 177 for the current application crash are added to analysis results data base 189 via data flow 210. However if the result in step 322 from the comparison of step 320 is found to be an empty set (i.e., no OS update binary of step 316 refers to the current crash stack trace), then the current application crash entry is filtered (removed) in step 324 from the date-filtered data set of step 314 to form a binary-filtered data set, and methodology 300 repeats to step 318 where a different application crash stack trace corresponding to a next different application crash entry is selected from the binary-filtered data set of step 324 to be analyzed as the current application crash in similar manner as described above. Steps 318 to 326 may proceed iteratively as described above for as long as there is data remaining to be analyzed in the date-filtered dataset of step 314.

As a hypothetical example for the steps 318-326, assume that the set of retrieved application stack traces from step 318 includes a stack trace with MSXML6.dll on it, and also assume that MSXML6.dll was indeed one of the binaries serviced by a culprit OS update 177 (e.g., KB123456) contained in the set of OS update binaries of step 316. In such a case, MSXML6.dll defines an intersection between the set of OS update binaries of step 316 and the retrieved set of application crash stack traces of step 318. This increases the confidence that there was a bug in the non-driver binary MSXML6.dll shipped in the particular culprit OS update 177 (e.g., KB123456). This analysis of steps 318-326 may be employed to prevent using pure association rules to erroneously flag non-problem OS updates 177 as application crash culprits just because they were shipped by the OS vendor 175 at the same time as the problem OS update 177 (and thus tend to be installed by customers at the same time as the problem update).

Still referring to FIG. 3, in step 328 a support agent service 186 executing on a given client information handling system (e.g., system 110$_1$ in FIG. 3) may periodically (e.g., once every day or other suitable time period) query analysis and learning logic 185 of backend server 151$_2$ via data flow 212 for any new culprit OS updates 177 that have been added to analysis results data base 189, and that correspond to a likely culprit cause for an application crash event reported by the given client system 110 to backend server 151$_2$ since the last query iteration (if any) of step 328. In step 330, analysis and learning logic 185 of backend server 151$_2$ may respond to this query by analyzing the filtered culprit OS-to client application crash correlations contained in the analysis results data base 189 to locate and retrieve any culprit OS updates 177 via data flow 210 that correspond to one or more given client application versions 182 for which crash events have been reported on previous days to backend server 151$_2$ by the given client system 110 during periodic uploads of data flow 204. Once located and retrieved, analysis and learning logic 185 may report the identity of these retrieved culprit OS updates 177 corresponding to reported application crash events via data flow 214 from backend server 151$_2$ to the support agent service 186 on client system 110.

As a hypothetical example, assume support agent service 186 of a given client system 110$_1$ executing the Windows 10 RS3 operating system with installed KB123456 OS update has previously reported an XYZ crash of Adobe Reader® version XY application to analysis and learning logic 185 of backend server 151$_2$. In this example, "crash XYZ" refers to a specific crash identified by a unique signature that may be generated by a respective support agent service 186 as part of the crash information uploaded from each client system 110 (e.g., the signature may be a simple hash of several fields such as crashing application name, version, date, as well as the full stack trace string).

Analysis and learning logic 185 on backend server 151$_2$ may respond in step 330 to a periodic step 328 query (via data flow 212) from the given client system 110$_1$ by analyzing analysis results data base 189 to locate and report to support agent service 186 (via data flow 214) that an XYZ crash of Adobe Reader® vXY is associated with non-driver MSXML6.dll binary update in OS updates KB123456 and KB123457. In this example, analysis and learning logic 185 on backend server 151$_2$ reports all the implicated candidate OS updates KBXXXXXXs (e.g., including both KB123456 and KB123457) for a given crash XYZ of Adobe Reader® vXY to the support agent service 186 running on the client system 110$_1$. In such a case, support agent service 186 may respond by looking for each reported candidate OS update on client system 110$_1$ and filtering out any candidate OS updates that are not installed on client system 110$_1$ (in this example KB123457) to leave only those candidate OS updates (i.e., "target OS updates") that are actually installed on the client system 110 (in this example KB123456).

Returning to FIG. 2, the support agent service 186 on client system 110$_1$ may then build and display a user report that identifies the remaining target culprit OS updates (e.g., identified since the last such report) and for which the analysis and learning logic 185 and support agent service 186 have worked together to identify the target culprit OS updates 177. In this embodiment, the user may only be given the particular target OS update/s that should be currently removed and/or blocked from the system 110$_1$. The support agent service 186 then may make this user report available to a user-facing application 182 executing on client system 110$_1$ which is programmed to automatically display the information of this report to the human user 250 via data flow 216 and user interface (UI) 115 on display device 109. Information which may be so displayed on UI 115 may include, for example, a table of application crashes for a given client application version 182 (such as Adobe Reader® vXY) with corresponding target culprit OS update/s 177 (e.g., only KB123456 in the current example), thus guiding the user 250 toward these target culprit OS updates 177 they can try removing from client system 110$_1$. The human user 250 may respond to this information, for example, by using Windows Update tool to remove the KB123456 update from the client system 110$_1$ and/or optionally blocking this OS update from being reinstalled onto system 110$_1$ until the OS vendor 175 fixes the bug in this update. In one exemplary embodiment, the support agent service 186 may optionally take one or more automatic actions to prevent future application crashes of the given client application version 182, e.g., by instructing Windows update tool of OS 180 to automatically remove and/or block the identified target culprit OS updates (e.g., KB123456) from the client system 110$_1$ without instruction from user 250, in which case user 250 may be notified of the actions taken via UI 115.

It will be understood that the data flow and methodology of FIGS. 2 and 3 are exemplary only, and that any combination of fewer, additional and/or alternative steps and/or data flow may be employed that are suitable for collecting and correlating a history of operating system (OS) updates with occurrence of past client application crashes on one or more client information handling systems so that action/s may be taken to prevent occurrence of future client application crashes on the information handling system/s.

It will be understood that one or more of the tasks, functions, or methodologies described herein (e.g., including those described herein for components 101, 102, 104, 106, 108, 152, 154, 156, 158, 159, 191, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions is configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus, the invention is not limited to only those combinations shown herein, but rather may include other combinations.

What is claimed is:

1. A method, comprising:
   gathering information in at least one server information handling system across a network from multiple client information handling systems, the gathered information including a history of updates made to an operating system (OS) executing on each of the multiple client information handling systems, and a history of crashes of different client applications executing on the multiple client information handling systems;
   correlating the history of operating system (OS) updates with the history of client application crashes in the at least one server information handling system to identify one or more candidate OS updates potentially responsible for causing a given client application to crash on the multiple client information handling systems;
   receiving in the at least one server information handling system a report of a crash event of the given client application that has occurred on a given one of the multiple client information handling systems, the report of the crash event of the given client application being received across the network at the server information handling system from the given client information handling system;
   then providing across the network from the at least one server information handling system to the given client information handling system an identity of the one or more identified candidate OS updates potentially responsible for causing the given client application to crash on the given client information handling system; and
   then taking one or more actions in the given client information handling system to prevent occurrence of future crashes of the given client application caused by the identified candidate OS updates on the given client information handling system.

2. The method of claim 1, further comprising:
   determining in the given client information handling system whether any one or more target OS updates are currently installed on the client information handling system that correspond to the identity of one or more of the identified candidate OS updates provided by the at least one server information handling system; and
   where the one or more actions taken in the given client information handling system comprise at least one of automatically removing any determined target OS updates from the given client information handling system or automatically blocking the identified candidate OS updates from installation or re-installation on the given client information handling system.

3. The method of claim 2, where the one or more actions taken in the given client information handling system comprise automatically removing any determined target OS updates from the given client information handling system.

4. The method of claim 1, further comprising:
   determining in the given client information handling system whether any one or more target OS updates are currently installed on the client information handling system that correspond to the identity of one or more of the identified candidate OS updates provided by the at least one server information handling system; and
   where the one or more actions taken in the given client information handling system comprise instructing a user of the given client information handling system to remove any determined target OS updates from the given client information handling system, or to block the identified candidate OS updates from installation or re-installation on the given client information handling system.

5. A method, comprising:
   gathering information across a network from multiple information handling systems, the information including a history of updates made to an operating system (OS) executing on each of the multiple information handling systems, and a history of crashes of different client applications executing on the multiple information handling systems;
   correlating the history of operating system (OS) updates with the history of client application crashes to identify one or more candidate OS updates potentially responsible for causing a given client application to crash on the multiple information handling systems; and
   taking one or more actions to prevent occurrence of future crashes of the given client application caused by the identified candidate OS updates on one or more of the multiple information handling systems;
   where the gathered history of OS updates made to the operating system (OS) comprises data about each OS update that includes at least an identifier of each OS update and a date that each OS update occurred; and
   where the gathered history of client application crashes comprises data about each application crash that includes an application identifier and version of each crashed application, application crash stack trace/s for each application crash instance, and a date that each application crash occurred.

6. The method of claim 5, further comprising uploading the data about each OS update and the data about each application crash from each of multiple client information handling systems to a backend server; then correlating the history of operating system (OS) updates with the history of client application crashes at the backend server to identify the one or more candidate OS updates for an application crash that occurred on a given client information handling system; and then providing the identified candidate OS updates to the given client information handling system across the network in response to a query from the given client information handling system.

7. The method of claim 6, further comprising taking the one or more actions at the given client information handling system by first determining one or more target OS updates installed on the client information handling system that correspond to one or more of the identified candidate OS updates; building and displaying a report to a user of the given client information handling system that identifies the one or more target OS updates; and then responding to instructions received from the user to remove and/or block the one or more target OS updates from the given client information handling system by removing and/or blocking the one or more target OS updates from the given client information handling system.

8. The method of claim 6, further comprising taking the one or more actions at the given client information handling system by first determining one or more target OS updates installed on the client information handling system that correspond to one or more of the identified candidate OS updates; and then automatically removing and/or blocking the one or more target OS updates from the given client information handling system.

9. The method of claim 5, where correlating the history of the OS updates with the history of client application crashes comprises limiting the one or more candidate OS updates potentially responsible for causing a given client application to crash on the multiple information handling systems to only OS updates having one or more binaries that are referred to in the application crash stack trace.

10. The method of claim 5, where correlating the history of the OS updates with the history of client application crashes comprises limiting the one or more candidate OS updates potentially responsible for causing a given client application to crash on the multiple information handling systems to only OS updates installed on the multiple client information handling systems within a predefined time frame of the date of the occurrence of the crash of the given application.

11. A method, comprising:
gathering information across a network from multiple information handling systems, the information including a history of updates made to an operating system (OS) executing on each of the multiple information handling systems, and a history of crashes of different client applications executing on the multiple information handling systems;
correlating the history of operating system (OS) updates with the history of client application crashes to identify one or more candidate OS updates potentially responsible for causing a given client application to crash on the multiple information handling systems; and
taking one or more actions to prevent occurrence of future crashes of the given client application caused by the identified candidate OS updates on one or more of the multiple information handling systems;
where correlating the history of operating system (OS) updates with the history of client application crashes to identify the one or more candidate OS updates further comprises using association rules to correlate the history of OS updates with the history of client application crashes to determine an intermediate set of OS update-to-client application associations, and then date range-filtering the determined intermediate data set of OS update-to-client application associations to identify the one or more candidate OS updates by removing any OS update-to-client application crash associations that includes an OS update having a release date that occurred before a pre-defined range date range.

12. The method of claim 11, where correlating the history of operating system (OS) updates with the history of client application crashes to identify the one or more candidate OS updates further comprises restricting the date-range filtered set of OS update-to-client application associations to only include associations between OS updates and given client application crashes for those OS updates that contain one or more binaries corresponding to one or more binaries obtained from a crash stack trace for a given client application crash.

13. A system, comprising a least one server information handling system coupled across a network to a given client information handling system, the at least one server information handling system comprising at least one first programmable integrated circuit that is programmed to:
gather information across a network from multiple client information handling systems, the gathered information including a history of updates made to an operating system (OS) executing on each of the multiple client information handling systems, and a history of crashes of different client applications executing on the multiple client information handling systems;
correlate the history of operating system (OS) updates with the history of client application crashes to identify one or more candidate OS updates potentially responsible for causing a given client application to crash on the multiple client information handling systems;
receive a report of a crash event of the given client application that has occurred on a given one of the multiple client information handling systems, the report of the crash event of the given client application being received across the network at the server information handling system from the given client information handling system; and
respond to the report of the crash event by transmitting the identity of the one or more candidate OS updates potentially responsible for causing the given client application to crash across the network to the given client information handling system;
where the given client information handling system comprises at least one second programmable integrated circuit that is programmed to take one or more actions in the given client information handling system in response to the transmitted identity of the one or more candidate OS updates from the server information handling system to prevent occurrence of future crashes of the given client application caused by the identified candidate OS updates on the given client information handling system.

14. The system of claim 13, where the at least one second programmable integrated circuit is programmed to take one or more actions in the given client information handling system that comprise at least one of automatically removing one or more of the particular candidate OS updates from the given client information handling system or automatically blocking one or more of the particular candidate OS updates from installation or re-installation on the given client information handling system.

15. The system of claim 14, where the at least one second programmable integrated circuit is programmed to take one or more actions in the given client information handling system that comprise automatically removing one or more of the particular candidate OS updates from the given client information handling system.

16. The system of claim 13, where the at least one second programmable integrated circuit is programmed to take one or more actions in the given client information handling system that comprise instructing a user of the given client information handling system to remove one or more of the particular candidate OS updates from the given client information handling system, or to block one or more of the particular candidate OS updates from installation or re-installation on the given client information handling system.

17. A system, comprising at least one first programmable integrated circuit programmed to:
   gather information across a network from multiple information handling systems, the information including a history of updates made to an operating system (OS) executing on each of the multiple information handling systems, and a history of crashes of different client applications executing on the multiple information handling systems;
   correlate the history of operating system (OS) updates with the history of client application crashes to identify one or more candidate OS updates potentially responsible for causing a given client application to crash on the multiple information handling systems; and
   transmit the identity of the one or more candidate OS updates potentially responsible for causing a given client application to crash across the network to at least one of the multiple information handling systems;
   where the gathered history of OS updates made to the operating system (OS) comprises data about each OS update that includes at least an identifier of each OS update and a date that each OS update occurred; and
   where the gathered history of client application crashes comprises data about each application crash that includes an application identifier and version of each crashed application, application crash stack trace/s for each application crash instance, and a date that each application crash occurred.

18. The system of claim 17, further comprising a first information handling system that is a backend server that includes the first programmable integrated circuit, the first programmable integrated circuit being programmed to:
   receive across the network uploaded data about each OS update and uploaded data about each application crash from each of multiple client information handling systems;
   then correlate the history of operating system (OS) updates with the history of client application crashes at the backend server to identify the one or more candidate OS updates for an application crash that occurred on a given client information handling system; and
   then provide the identified candidate OS updates to a given client information handling system across the network in response to a query from the given client information handling system.

19. The system of claim 18, further comprising the given client information handling system, the given client information handling system comprising a second programmable integrated circuit programmed to take one or more actions by:
   first determining one or more target OS updates installed on the given client information handling system that correspond to one or more of the identified candidate OS updates;
   building and displaying a report to a user of the given client information handling system that identifies the one or more target OS updates; and
   then responding to instructions received from the user to remove and/or block the one or more target OS updates from the given client information handling system by removing and/or blocking the one or more target OS updates from the given client information handling system.

20. The system of claim 18, further comprising the given client information handling system, the given client information handling system comprising a second programmable integrated circuit programmed to take one or more actions by:
   first determining one or more target OS updates installed on the client information handling system that correspond to one or more of the identified candidate OS updates; and
   then automatically removing and/or blocking the one or more target OS updates from the given client information handling system.

21. The system of claim 17, where the at least one first programmable integrated circuit is programmed to correlate the history of the OS updates with the history of client application crashes at least in part by limiting the one or more candidate OS updates potentially responsible for causing a given client application to crash on the multiple information handling systems to only OS updates having one or more binaries that are referred to in the application crash stack trace.

22. The system of claim 17, where the at least one first programmable integrated circuit is programmed to correlate the history of the OS updates with the history of client application crashes at least in part by limiting the one or more candidate OS updates potentially responsible for causing a given client application to crash on the multiple information handling systems to only OS updates installed on the multiple client information handling systems within a predefined time frame of the date of the occurrence of the crash of the given application.

23. A system, comprising at least one first programmable integrated circuit programmed to:
   gather information across a network from multiple information handling systems, the information including a history of updates made to an operating system (OS) executing on each of the multiple information handling systems, and a history of crashes of different client applications executing on the multiple information handling systems;
   correlate the history of operating system (OS) updates with the history of client application crashes to identify one or more candidate OS updates potentially responsible for causing a given client application to crash on the multiple information handling systems; and
   transmit the identity of the one or more candidate OS updates potentially responsible for causing a given client application to crash across the network to at least one of the multiple information handling systems;

where the at least one first programmable integrated circuit is further programmed to:
- identify the one or more candidate OS updates by using association rules to correlate the history of OS updates with the history of client application crashes to determine an intermediate set of OS update-to-client application associations; and
- then date range-filter the determined intermediate data set of OS update-to-client application associations to identify the one or more candidate OS updates by removing any OS update-to-client application crash associations that includes an OS update having a release date that occurred before a pre-defined range date range.

24. The system of claim 23, where at least one first programmable integrated circuit is further programmed to identify the one or more candidate OS updates by restricting the date-range filtered set of OS update-to-client application associations to only include associations between OS updates and given client application crashes for those OS updates that contain one or more binaries corresponding to one or more binaries obtained from a crash stack trace for a given client application crash.

* * * * *